Figure 1:
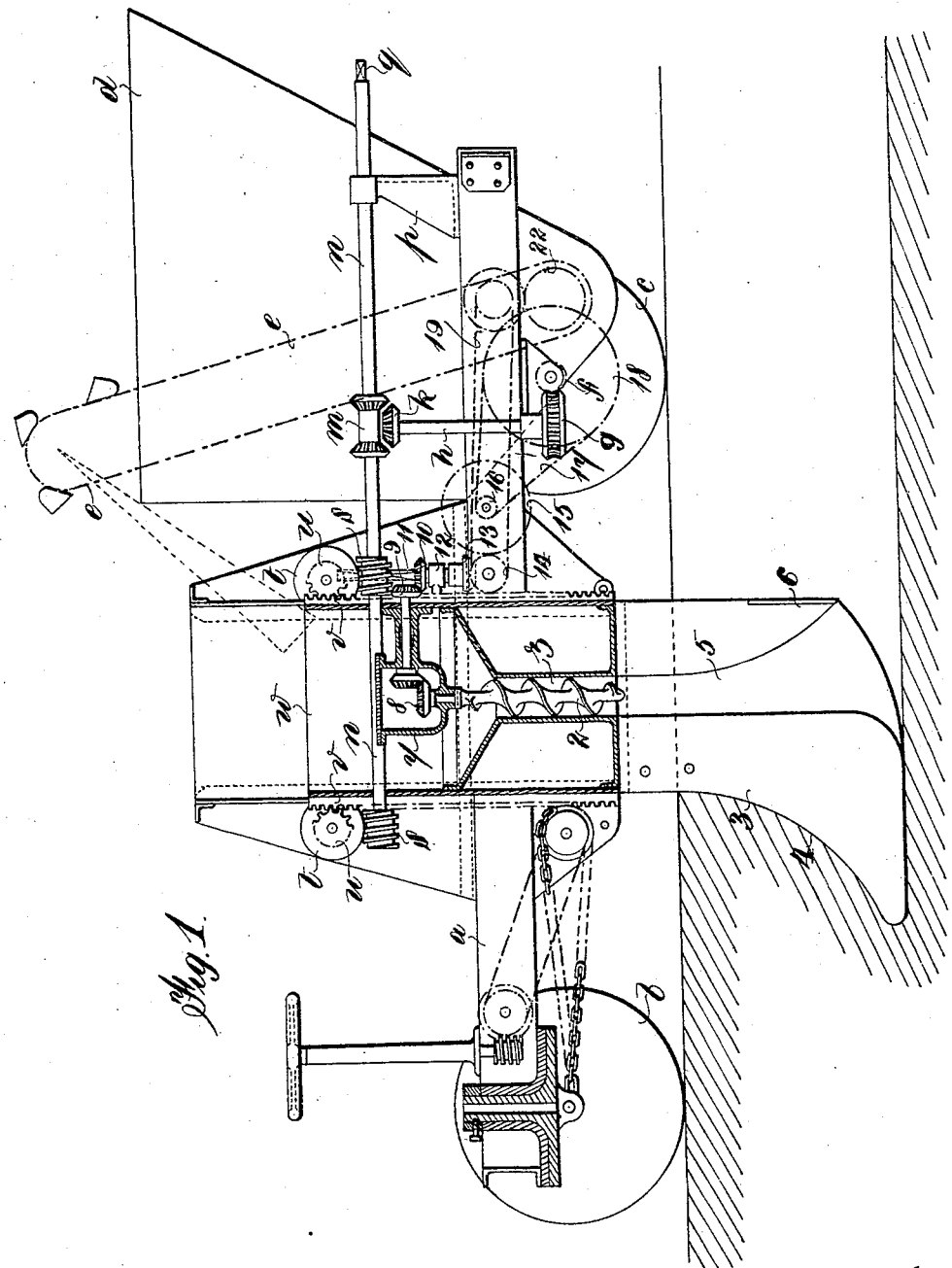

J. SCOTT.
MECHANICAL LAND DRAINER.
APPLICATION FILED FEB. 6, 1909.

943,571.

Patented Dec. 14, 1909.
3 SHEETS—SHEET 1.

Witnesses
W. Map. Duvall
Geo. A. Byrne.

Inventor
John Scott
by
Williamson Fisher &
Williamson
Attorneys

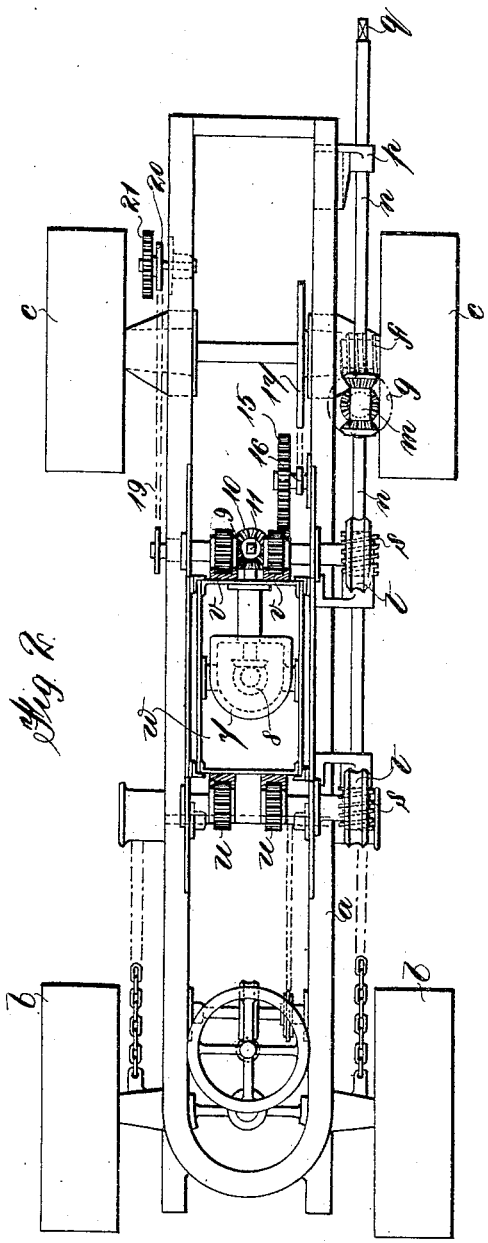

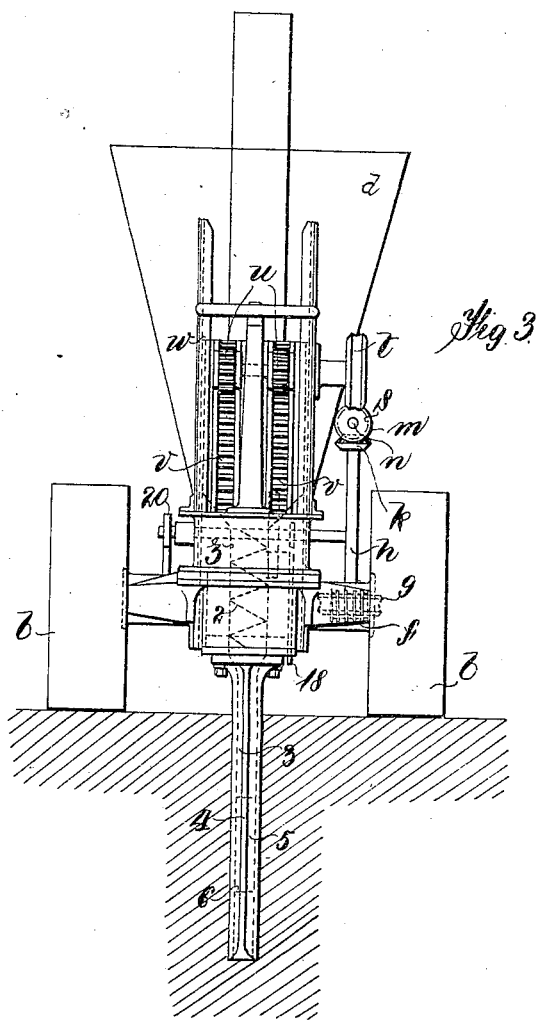

UNITED STATES PATENT OFFICE.

JOHN SCOTT, OF HAMMERSMITH, ENGLAND.

MECHANICAL LAND-DRAINER.

943,571.   Specification of Letters Patent.   Patented Dec. 14, 1909.

Application filed February 6, 1909.   Serial No. 476,454.

*To all whom it may concern:*

Be it known that I, JOHN SCOTT, a subject of the King of England, residing at 3<sup>A</sup> Astrop Terrace, The Grove, Hammersmith, in the county of London, England, have invented certain new and useful Improvements in Mechanical Land-Drainers; and I do hereby declare the following to be a full, clear, and exact description of the invention, such as will enable others skilled in the art to which it appertains to make and use the same.

This invention relates to an improved machine for forming drains in land, and to a method of draining land for which such machine is especially suitable.

The machine is of the type wherein a wheeled vehicle is provided which may be self-propelled or otherwise, which wheeled vehicle is furnished with means for forming a channel or furrow in the ground, which means may be vertically adjustable with respect to the wheeled vehicle, e. g. by means of moving racks actuated by pinions.

In particular the present machine is designed for opening a narrow channel to any desired depth, and depositing in the bottom of the cut a layer of burnt clay (ballast) sand, gravel, or other granular material to form the porous drain, in order to give a free passage to soil water.

My machine comprises a wheeled vehicle, which may be driven by a motor carried thereon, or may be a trailer attached to a motor vehicle, or may be hauled by a steam or other engine, with a wire rope and winding drum, from the headland of the field. The body of the machine is adapted to carry a load of burnt clay or other draining material, and the frame of the machine has attached to it the appliances and appurtenances for forming the drain, and the gear for raising and lowering the said appliances.

The colter which opens the soil is carried by a framework, which can in a manner already known, when desired, be so connected or intergeared with mechanism actuated by the forward motion of the wheeled vehicle, that such framework carrying with it the colter is caused to rise and fall as the vehicle moves forward, thus enabling the depth of the channel to be gradually diminished or increased. An important feature of my invention is an advantageous mechanism for effecting this object. In addition to this the colter, which I prefer to employ, is provided with a passage extending through it, by means of which the granular or other substance is fed down into the furrow, with means, in connection with such passage, for feeding the said substance down to the furrow. This colter which may be raised or lowered independently or in connection with other parts of the machine is, in its forepart a slight curved knife-like or sharp edged piece of solid steel, expanded to a given width rearward, and elongated rearward in its hollow part to give passage to the burnt clay or other material used to form the drain channel. The hollow colter has connected with it a forced feed arrangement in the form of a spiral conveyer, which is fed from a hopper kept supplied from the wagon body, by an endless chain or other form of carrier. To the side of the machine is attached an arrangement, comprising a shaft with worm and bevel gear, operated from the traveling wheels, whereby the said colter, while the vehicle is in motion, can be automatically raised or lowered sufficiently, in any distance traveled by the machine, to give the drain a proper degree of fall or inclination, even when the ground is level. With the reverse motion provided on this shaft, the machine can grade the depth either in cutting from or toward the mouth of the drain. The colter is raised clear of the ground, or lowered, as the case may be, by means of a rack or racks (attached vertically to its upper end) meshing with pinions on a horizontal shaft or shafts, operated either mechanically or by hand, causing both the colter and the force feed arrangement to slide up or down within the roller fitted grooved brackets; or the colter only may be raised clear of the ground, by causing it to slide forward and upward, by means of racks. The colter is also provided with an arrangement so that the depth of burnt clay or other material delivered into the drain may be varied at will. This consists of a slide working up and down in the back of said colter, and controlled either by hand or by mechanically operated gear. The colter may be alternatively made with a blunt face, and have an adjustable sheath face or knife edge, easily replaceable by a fresh one, when worn out, to protect the hollow colter from wear. And in order that my said invention may be better understood, I will proceed to describe the same with reference to the drawings accompanying this specification, in which:—

Figure 1 shows a side elevation partly in section of a land draining machine constructed according to my invention; Fig. 2 is a plan of same; Fig. 3 is a front elevation of the machine.

The same letters and numerals of reference are employed to denote the same parts in all the views.

The machine comprises a wheeled vehicle formed by a framing $a$ with two pairs of wheels $b$ and $c$ respectively. The vehicle may be driven by a suitable motor, carried thereon, or may be hauled by a steam or other engine.

$d$ is a receptacle for containing burnt clay or other draining material.

$e$ is a bucket conveyer of a well-known type for elevating and delivering the contents of the receptacle $d$.

On the shaft of the wheels $c$ is a worm $f$ gearing with a worm wheel $g$, the vertical shaft $h$ of which has mounted at the back a bevel wheel $k$ capable of engaging with one or other of two other bevel wheels $m$. The bevel wheels $m$ are mounted on a horizontal shaft $n$, passing through a bracket $p$ at the back of the apparatus, provided with a squared end $q$ on which an ordinary winch handle can be fitted when it is desired to rotate the shaft by hand.

Mounted on the shaft $n$ are two worms $s$ which engage with worm wheels $t$. On the shaft of each of these worm wheels $t$ are mounted two toothed wheels $u$ which mesh with racks $v$ fixed to the sides of a sliding receptacle or container $w$. This container, which is rectangular in cross section, is funnel-shaped toward the bottom and opens into a passage $z$. In this passage way $z$ works a feeding Archimedean crew 2, driven as hereinafter explained. Attached to the bottom of the receptacle $w$ and below the opening of the passage $z$ is a colter 3. This colter 3 at the forepart has a slightly curved knife-like or sharp edge piece 4 of solid steel, expanded rearward and also elongated rearward into a hollow part 5 to give passage to the clay or other material fed from the passage $z$.

6 is a flap or adjustable slide which can be raised and lowered to regulate the depth of the layer of material fed into the cut.

7 is a gear box placed in the receptacle $w$ which contains bevel gearing 8, one of the bevels driving the Archimedean feeder 2, and the other is driven by a bevel 9. This bevel is turned by a bevel 10 on a vertical shaft 11. Beneath this bevel 10 is a bracket 12 fixed to the side of the container $w$ so as to rise and fall therewith. The shaft 11 is squared at the top and passes through a corresponding hole in the bevel 10 so that the driving is not interfered with as the container rises and falls on the rack.

13 is a miter wheel attached to the bottom of the shaft 11. This miter wheel 13 is driven from a corresponding bevel wheel on a shaft, on which shaft is keyed a gear wheel 14. Meshing with this gear wheel 14 is a large gear wheel 15 having keyed on the same shaft therewith a sprocket wheel 16 around which passes a chain 17 which also passes around a large sprocket wheel 18 driven from the axle of the back wheels $c$.

Referring to the driving of the conveyer $e$, this is effected from the shaft on which the gear wheel 14 is mounted. On this same shaft is a sprocket wheel around which passes a chain 19 which passes also around a sprocket wheel 20 on another shaft, on which is keyed a gear wheel 21 meshing with a gear wheel 22 which drives the band of the conveyer $e$.

The operation of the device will be readily understood:—The material to be fed into the cuts is placed in the receptacle $d$. From thence it is fed by the conveyer $e$ and falls into the receptacle $w$, whence it is fed downward by the Archimedean feeder through the passage $z$. The colter 3 is adjusted at the commencement of each cut to cut to a suitable depth, and as the machine travels toward the other end of the cut the colter 3 rises automatically but very slowly under the influence of the worm and bevel gearings actuating the racks $v$. When desired the bevel gear can be thrown out of gear or reversed by putting either of the bevels $m$ in gear with the bevel $k$ or leaving the bevel $k$ in the central position as shown in the drawings at Fig. 1. The colter 3 may also if desired, be raised by hand by means of a winch handle actuating the spindle of the shaft $n$.

The haulage rope can be attached to the frame or it may be fixed to the front edge of the colter at varying heights.

I prefer that the colter shall rise automatically at the rate of about 12 inches in three hundred yards.

It will be understood that I do not confine myself to the particular details of construction herein described and shown on the drawings, as the construction of the machine may be varied in many ways as to detail without departing from the essential principles thereof.

What I claim and desire to secure by Letters Patent of the United States of America is:—

1. In a machine for forming drains the combination of a hopper; a hollow colter located to one side of said hopper; means for conveying material from said hopper to said colter; and means for automatically raising or lowering said colter; substantially as described.

2. In a machine for forming drains the combination of a hopper; a hollow colter; a receptacle to which said colter is attached; means for feeding material from said hopper to said receptacle; and means for feeding material from said receptacle to said colter; substantially as described.

3. In a machine for forming drains, the combination of a hopper; a hollow colter; a receptacle to which said colter is attached; means for raising and lowering said receptacle; means for feeding material from said hopper to said receptacle; means for feeding material from said receptacle to said colter; and means for rotating said last mentioned feeding means; substantially as described.

4. In a machine for forming drains the combination of a hopper; a receptacle; a conveyer for transporting material from said hopper to said receptacle; a colter below said receptacle; means for adjusting the said colter to regulate the depth of the cut; automatic means for causing said colter to slowly rise when it nears the end of the cut; and means for feeding material from said receptacle to said colter; substantially as described.

5. In a machine for forming drains, the combination of a hollow colter; a receptacle; a screw for conveying material from said receptacle to said colter; means for raising and lowering said colter; and means for regulating the delivery of material from said colter; substantially as described.

6. In a machine for forming drains the combination of a hopper; a conveyer in said hopper; a receptacle adapted to receive material from said conveyer; a colter attached to said receptacle; means comprising worm gearing for raising and lowering said colter and receptacle; a screw conveyer for delivering material from said receptacle to said colter; means for operating the same; and means for controlling the delivery of material from said colter; substantially as described.

In testimony whereof, I affix my signature, in presence of two witnesses.

JOHN SCOTT.

Witnesses:
  LILY SIMMS,
  A. O. VIDALY.